Nov. 27, 1928.
R. KAUCH ET AL
1,693,510
GROUND SPEED INDICATOR
Filed July 17, 1924
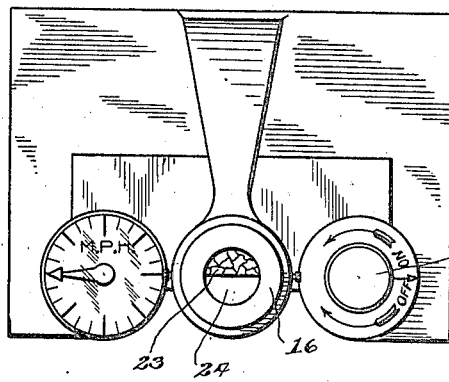
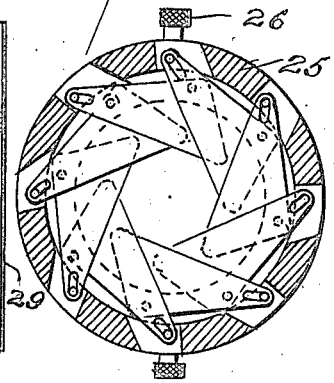
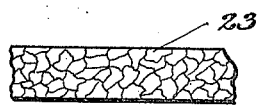
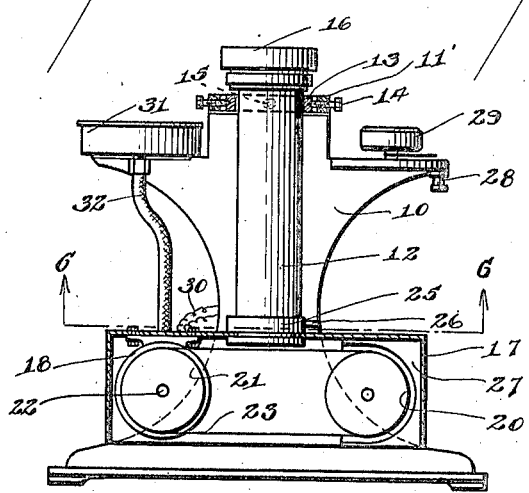
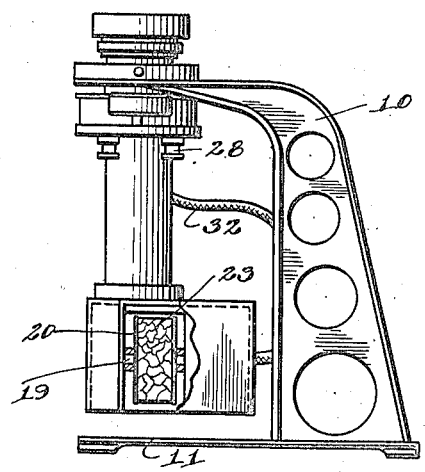
INVENTOR
Robert Kauch
Charles L. Paulus
BY
Robert H. Young
ATTORNEY Patented Nov. 27, 1928.

1,693,510

UNITED STATES PATENT OFFICE.

ROBERT KAUCH AND CHARLES L. PAULUS, OF DAYTON, OHIO.

GROUND-SPEED INDICATOR.

Application filed July 17, 1924. Serial No. 726,550.

This invention relates to ground speed indicators for aircraft.

The principal object of the invention is to provide a direct reading instrument of the kind mentioned which is far more accurate than previously available instruments due largely to the fact that its readings are not based on the readings of other instruments, such as altimeters, which introduce errors in the calculations of ground speeds.

With the foregoing object in view, the invention provides an instrument comprising a sight through which the ground is viewed on a constant line of sight and in a restricted manner so that it appears as a blur as it sweeps by; a driven member, such as a belt, driven at high speed so that a blur produced thereby is similar to the other blur; and means for varying the appearance of the blur produced by the driven member, so that the blurs appear similar. The ground speed may then be indicated by a suitable calibrated scale.

Other objects of the invention have reference to details of construction on an instrument for accomplishing the above purpose, and will be brought out, together with the foregoing objects, in the course of the following specification, in which reference is made to the accompanying drawing, wherein:

Fig. 1 is a front view partly in section of a ground speed indicator constructed in accordance with the invention.

Fig. 2 is a side view partly in section of Fig. 1.

Fig. 3 is a plan view of the instrument.

Fig. 4 is an isolated fragmentary detail of the driven belt forming a part of the instrument showing the camouflage markings provided on the belt, and Fig. 5 is a view similar to, Fig. 4 showing a different scheme of marking for accomplishing the same purpose for which the markings shown in Fig. 4 are provided.

Fig. 6 is an enlarged section view looking in the direction of the arrows along the line 6—6 of Fig. 2, showing a conventional type of an opening and closing diaphragm.

The instrument is mounted in a convenient place in the cockpit, preferably in a position permitting the pilot or observer to sight through the same to the ground through a floor opening. It comprises a bracket 10 extending vertically from a base 11 fastened to the floor of the cockpit and having a ring support 11' for a tubular pendulum 12 constituting the sighting tube. The support 11 has a ring 13 pivoted on trunnions 14 provided by screws passed through the ring 11' in diametrically opposed relation. The tube 12 is pivoted on trunnions 15 provided by screws in the ring 13 disposed in diametrically opposed relation and displaced 90° from the trunnions 14. This gimbal joint provides a universal pivotal mounting for the tube 12 so that the latter depends from the support 11' always in a true vertical position. The upper end of the tube 12 is fitted with an eye piece 16 for sighting down through the tube. The lower end of the tube carries a hollow base 17 which provides a support at one side of the tube for a small electric motor 18 and, at the other side of the tube, a bearing 19 for an idler pulley 20. The motor 18 has a drive pulley 21 on its armature shaft 22 for driving an endless belt 23 passing over the pulley 20. The belt 23, as indicated in Fig. 2, passes beneath the tube 12 on one side of the center thereof giving a view through the eye piece 16 shown in Fig. 3, the other half 24 of the view being that of the ground as it sweeps by in the movement of the plane. The tube 12 is fitted at its lower end with a diaphragm 25 having a small lever 26 extending from the side thereof by which means the sight aperture may be regulated, for different altitudes, and in such a manner that the operator observes the earth as a continuous blur.

The pendulum 12 swings freely to assume a vertical dependent position upon any inclination of the plane. It is therefore necessary to balance the pendulum 12 rather accurately and all parts contained within the base 17 on opposite sides of the tube 12 are counterbalanced. Counterweight 27 serves to counterbalance the weight of the motor 18.

The motor 18 is connected with a battery at the binding posts 28 and has a rheostat 29 connected in series with the wires 30 extending to the motor 18 to vary the current and thereby vary the speed of the motor and hence the driving of the belt 23 beneath the tube 12. If desired, the rheostat 29 may be so constructed that the adjustable brush thereof in one position is insulated to stop the motor. In other positions of the brush, more or less resistance may be introduced in circuit with the motor to vary its speed.

The speed of the motor 18 is indicated by a tachometer 31 having a flexible shaft 32 connected with the armature shaft 22 of the motor 18. The tachometer 31 as shown in Fig. 3, is calibrated directly in terms of miles per hour ground speed, so that the pilot on having varied the speed of the belt 23 to the proper extent, can determine at once the ground speed.

The ground as viewed in the restricted manner through the tube 12 on a constant vertical line, appears as a blur, no objects being distinguishable at all as the ground sweeps by in the flight of the plane. The belt 23 bears camouflage markings as shown in Fig. 4 which, in the movement of the belt beneath the tube 12, gives a blur similar to the blur visible in sighting the ground. The camouflage markings are applied in the usual manner with such colors as brown and green predominating.

The operation is as follows: When the speed of the belt 23 is adjusted so that the movement of its blur is approximately the same as the appearance of the ground blur, the ground speed may be read on the tachometer 31. The sight aperture adjustment is preferably one to provide two diameters, one in which the sight is fully open, and the other to restrict it a definite amount. When restricted the instrument is adapted to be used at higher altitude. The restriction is such that at higher altitudes only a sufficient portion of the ground is visible to create a blur of the proper characteristics without permitting objects to be distinguished and followed by the eye. The tachometer is calibrated directly in ground speed so as to give the correct reading at one setting of the sight aperture.

When the other setting of the opening is used, for use at lower altitudes, the readings of the tachometer must be multiplied by a constant of predetermined value, since the nature of the ground blur is changed by changing the amount of opening. When the movement of the belt 23 is too slow or too fast, there appears to be a noticeable relative movement between its blur and the ground's. Observations made with an instrument operating in this fashion were found to give the ground speed far more accurately than any previous type of instrument. In other instruments it was usually necessary to base the calculations of ground speed on an altimeter reading and this step introduced the inaccuracy of the altimeter which was compounded on the inherent inaccuracy of the ground speed indicator. Readings accurate to within three or four percent were found possible with an instrument operating on the principle of the invention. The instrument may be satisfactorily used over water, a blur being created in this case by the uneven reflection of light from the surface of the water due to small waves which create uneven reflection of light, observable in the instrument.

The markings on the belt 23 may be changed from the camouflage type shown in Fig. 4 to the stripe scheme shown in Fig. 5. It is contemplated that any form of means capable of producing a blur resembling the blur observed in the sweeping by of the ground may be used in the present invention.

We claim:

1. In a ground speed indicator, a non-transparent driven member, a sight for viewing the sweep by of the ground and over said member, and markings on said driven member whereby its blur on sweeping by the sight resembles the blur of the ground sweeping by, so that the relative speeds of the two may be more readily compared.

2. In a ground speed indicator, a non-transparent driven member, a sight for viewing the sweep by of the ground and of said member, and camouflaging on said driven member so that a blur is produced thereby on sweeping by said sight resembling the blur of the ground sweeping by.

3. In a ground speed indicator, a non-transparent driven belt, and a sight for viewing the ground, having equal portions of its opening occupied by the belt so that the sweep by of the ground and of the belt may be compared.

4. In a ground speed indicator, a non-transparent driven belt, a sight for viewing the ground having equal portions of its opening occupied by the belt so that the sweep by of the ground and of the belt may be compared, and markings on said belt so that the same on moving produces a blur resembling the blur of the ground sweeping by.

5. In a ground speed indicator, a motor driven opaque belt, means comprising a rheostat to vary the current to the motor driving said belt, to vary the speed of said motor, a sight viewing the ground and said belt, and means to measure the speed of said belt in terms of ground speed.

6. In a ground speed indicator, a motor driven opaque belt, means to vary the speed of said motor, a sight viewing the ground and said belt, and means to measure the speed of said belt in terms of ground speed.

7. In a ground speed indicator, a tubular sight for restrictedly viewing the ground, a part driven at varying speeds beneath said sight and visible through said sight to give a blur like that of the ground sweeping by, means to measure the speed of said part, and means for varying the restriction of vision through said tubular sight.

8. In a ground speed indicator, a tubular sight for restrictedly viewing the ground, a part driven at varying speeds beneath said sight and visible through said sight to give a blur like that of the ground sweeping by, means to measure the speed of said part, and means for varying the restriction of vision through said tubular sight so that the sight opening is smaller at higher altitudes.

9. In a ground speed indicator, a tubular sight for restrictedly viewing the ground, a part driven at varying speeds beneath said sight and visible through said sight to give a blur like that of the ground sweeping by, means to measure the speed of said part, and means for varying the restriction of vision through said tubular sight, comprising a manually adjustable diaphragm in said tubular sight.

10. In a ground speed indicator, a tubular sight mounted to have universal pivotal movement to occupy a true vertical position, a driven belt passing beneath the lower end of said tube to be visible through approximately one-half of the diameter of said tube producing a blur resembling the blur of the ground sweeping by and visible through the other half of the diameter of the tube.

11. In a ground speed indicator, a tubular sight mounted to have universal pivotal movement to occupy a true vertical position, a driven belt passing beneath the lower end of said tube to be visible through approximately one-half of the diameter of said tube producing a blur resembling the blur of the ground sweeping by and visible through the other half of the diameter of the tube, and a diaphragm for axially restricting the sight opening in said tube.

12. In a ground speed indicator, a tubular sight mounted to swing like a pendulum to a vertical position, a belt visible through said sight together with the ground as it sweeps by, a driver for said belt, and a tachometer connected with said driver for indicating the speed thereof.

13. In a ground speed indicator, a tubular sight mounted to swing like a pendulum to assume a true vertical position, a belt visible through said sight together with the ground as it sweeps by, a motor for driving said belt, and a rheostat for varying the speed of said motor.

14. In a ground speed indicator, a tubular sight mounted to swing like a pendulum to assume a true vertical position, a belt visible through said sight together with the ground as it sweeps by, a motor for driving said belt, a rheostat for varying the speed of said motor, and a tachometer connected with said motor to indicate the speed thereof.

15. In a ground speed indicator, means for keeping a constant line of sight to the ground with restricted vision, means to vary the restriction of vision according to altitude, a driven part visible through said sighting means, means to vary the speed of said driven part until the sweep thereof past said sight is approximately the same as the apparent sweep of the ground past said sight and means for indicating different ground speeds for different speeds of said driven part.

16. In a device for use on aircraft, comprising a sight for restrictedly viewing the ground as a blur, bearing portions on said device adapted to universally support said device tending to maintain said sight vertically aligned relative to the ground, a driven part of non-transparent material moving in and covering partially the field of vision of said sight, markings on said driven part tending to produce a second blur similar to that of the ground blur as said markings move across the field of vision of said sight, manually operable means for varying the movement of said driven part to bring said blurs into coincident movement and an indicator connected to said driven part to indicate the speed thereof.

17. In a device for use on aircraft, comprising a ground sighting device for restrictedly viewing the ground as a blur, bearing portions on said sighting device adapted to support said device and permit universal movement thereof, a non-transparent endless belt moving partially in the field of vision of said sighting device, markings on said belt tending to produce a second blur similar to said first-mentioned blur in the movement of said belt across the field of vision of said sighting device, means whereby the movement of said second blur may be brought into coincidence with the movement of said first blur to compare the same and an indicator connected to said means whereby to indicate the speed of said belt.

In testimony whereof we affix our signatures.

ROBERT KAUCH.
CHARLES L. PAULUS.